United States Patent [19]

Sweet

[11] 4,345,117
[45] Aug. 17, 1982

[54] TELEPHONE LINE FEED CIRCUIT

[75] Inventor: Anthony W. Sweet, Saffron Walden, England

[73] Assignee: Standard Telephones and Cables Limited, London, England

[21] Appl. No.: 208,559

[22] Filed: Nov. 20, 1980

[30] Foreign Application Priority Data

Nov. 29, 1979 [GB] United Kingdom ............... 7941245

[51] Int. Cl.³ .......................... H04M 1/00; H04B 3/16
[52] U.S. Cl. ....................................... 179/77; 179/16 F; 179/81 R
[58] Field of Search ............... 179/18 F, 18 FA, 16 F, 179/81 R, 70, 77, 170 R, 170 G

[56] References Cited

U.S. PATENT DOCUMENTS 3,870,896  3/1975  Kiko ...................................... 179/77
4,037,066  7/1977  Kiko .................................... 179/16 F
4,268,723  5/1981  Taylor ............................... 179/81 R Primary Examiner—Thomas A. Robinson
Attorney, Agent, or Firm—James B. Raden; Marvin M. Chaban

[57] ABSTRACT

To limit the line current dissipation in a telephone system it is considered desirable, especially in electronic systems, for the line current feed to be constant current. In the present arrangement the constant current supplied to the line is made adjustable in accordance with line conditions, especially the voltage between the line wires. A high impedance monitor is connected across the line to monitor the voltage between the two wires and to produce therefrom a reference voltage which is applied to the constant current generator so as to cause it to generate a current for line feed whose value is determined by the line voltage.

2 Claims, 9 Drawing Figures

TELEPHONE LINE FEED CIRCUIT

This invention relates to feeding arrangements for telephone subscribers' lines, in systems where the subscribers' instruments are powered over the lines from the telephone exchange.

Such line-feeding arrangements including constant current circuits have been proposed for various applications, and have been used where it is possible to operate the lines on a constant current basis, and where it is desirable to limit the dissipation in the line-feed or to reduce the size of the line-feed transformer by reducing its DC feed requirement. An asset of such circuits which has been recently exploited is that they can have a very high impedance to speech, so that they can be connected directly across the line without causing shunt loss to speech.

An object of the present invention is to extend the usefulness of such circuits, and hence the present invention provides a line-feeding arrangement for a telephone subscriber's line, which includes a constant current generator circuit connected to the speech wires of the line so as to feed direct current thereto, the circuit having a high impedance to speech currents, a monitoring circuit also connected to the speech wires of the line so as to monitor the direct voltage between the speech wires, said monitoring circuit also having a high impedance to speech currents, and control means associated with the monitoring circuit and the generator circuit and so arranged as to cause the current generated by the generator circuit to be varied in accordance with variations in the line voltage as monitored by the monitoring circuit.

Embodiments of the invention will now be described with reference to the accompanying drawings, in which.

Figure 1:
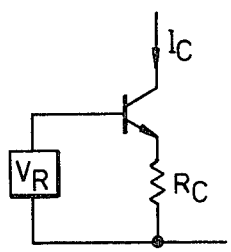
FIGS. 1, 2 and 3 are known circuits included for explanatory purposes.
Figure 2:
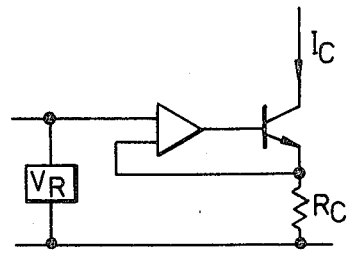
Figure 3:
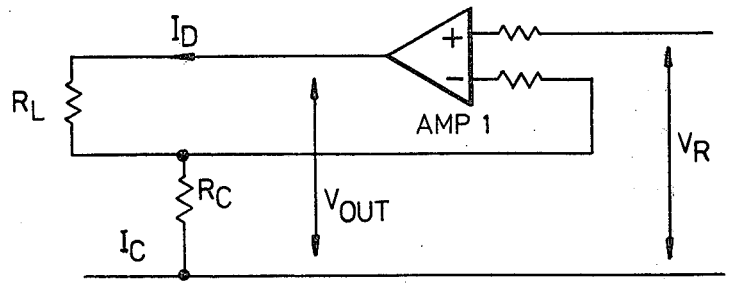

Constant current generating circuits are well-known, see FIGS. 1 and 2 which show two examples of such circuits; in which the direct current generated is controlled by the relations between the reference voltage $V_R$ and the resistance of the resistor $R_C$. FIG. 3 shows in rather more detail the arrangement of FIG. 2, the amplifier AMP1. This enables the effective source impedance of the circuit to be as high as required. The actual current delivered by the circuit is determined by an input reference voltage $V_R$ and the control resistor $R_C$, which is usually connected to the emitter of a controlling transistor.

Considering FIG. 3, we assume that the amplifier gain G is very large, and that its input impedance is high so that its input current is low. Hence for the amplifier:

$$V_{OUT} = G(V_R - I_o R_C) \quad (1)$$

and from FIG. 3

$$V_{OUT} = I_o(R_L + R_C) \quad (2)$$

From (1) and (2)

$$I_o(R_L + R_C) = GV_R - GI_o R_C \quad (3)$$

and $$I_o = \frac{GV_R}{R_L + R_C(1 + G)} \quad (4)$$

Because
$$R_L << R_C(1 + G)$$

$$I_o = \frac{V_R}{R_C} \quad (5)$$

Figure 4:
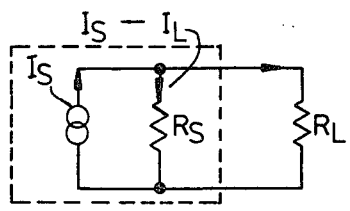
FIG. 4 is an equivalent diagram of part of FIG. 3, also included for explanatory purposes.

To find source impedance $R_S$, refer to FIG. 4.

For a load $R_A$
$$I_{LA}R_A = (I_S - I_{LA})R_S \quad (6)$$

and for a load $R_B$ $$I_{LB}R_B = (I_S - I_{LB})R_S \quad (7)$$

subtracting (6) − (7):

$$R_S = \frac{R_A I_{LA} - R_B I_{LB}}{I_{LB} - I_{LA}} \quad (8)$$

From (4)

$$I_{LA} = \frac{GV_R}{R_A + R_C(1 + G)} \quad (9)$$

$$I_{LB} = \frac{GV_R}{R_B + R_C(1 + G)} \quad (10)$$

Substituting in (8):

$$R_S = \frac{\frac{R_A \cdot G \cdot V_R}{R_A + R_C(1 + G)} - \frac{R_B \cdot G \cdot V_R}{R_B + R_C(1 + G)}}{\frac{G \cdot V_R}{R_B + R_C(1 + G)} - \frac{G \cdot V_R}{R_A + R_C(1 + G)}} \quad (11)$$

from this we have by simplification:

$$R_S = R_C(1 + G) \quad (12)$$

Hitherto when the constant current principle was used to obtain a high impedance feed the circuit delivered and fixed current to line. This has the disadvantage that, where the telephone instrument has a regulator to adjust speech output in accordance with the line length or resistance, the effect of the regulator is negated. This is overcome by the use of the circuits embodying the invention.

Figure 5:
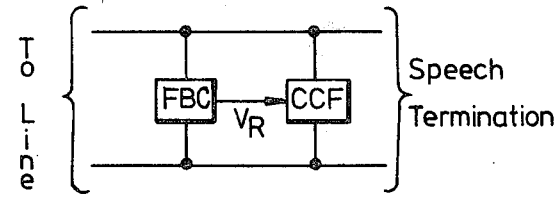
FIG. 5 is a highly simplified block diagram of an embodiment of the invention.

FIG. 5 is a highly simplified block diagram of a circuit embodying the invention, which is referred to as a programmable constant current arrangement. In this we have a constant current generating circuit CCF connected across the line wires, and a feed-back control circuit FBC also connected across the line. Both of these circuits have input impedance to speech, to avoid their presence causing any shunt loss of speech. The circuit FBC monitors the voltage across the line terminals, and produces a reference voltage $V_R$ which varies in accordance with the line voltage. This voltage $V_R$ is applied to the input of the constant current generated circuit CCF and controls the current which it applies to the line, and hence controls the voltage between the line terminals.

Figure 6:
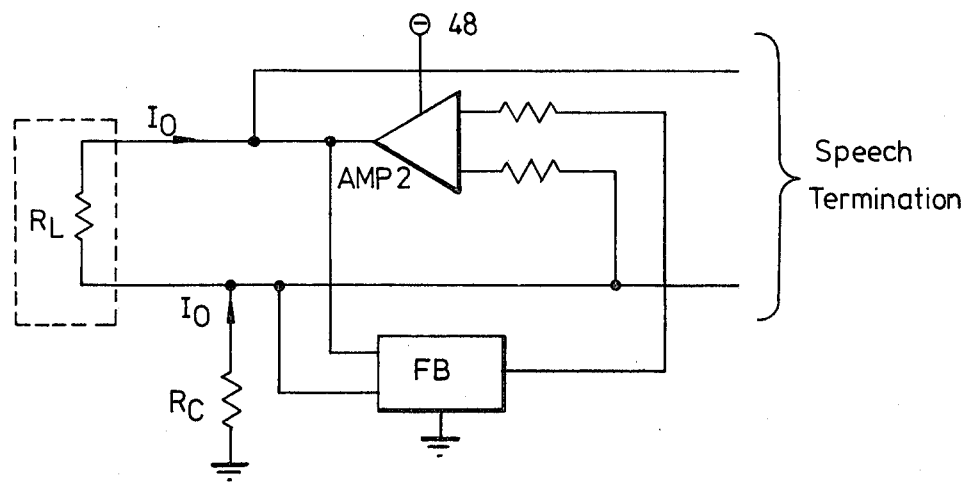
FIG. 6 is a more detailed representation of part of the arrangement of FIG. 5.

The principles of the circuitry in the block FBC of FIG. 5 will now be described with reference to FIG. 6. In FIG. 6, $R_L$ represents the resistance of the subscriber's line loop, $R_C$ is the control resistor and the amplifier AMP2 has a high gain G. The function of the feedback circuit FB is to provide a linear relationship between the reference voltage $V_R$ and the voltage across the line, so that $$V_R = C - K.I_o R_L \qquad (13)$$

where C is a voltage reference internal to the feedback loop FB and K is a constant of proportionality (K<1). From equation (4) we have $$I_o = \frac{G(C - K \cdot I_o R_L)}{R_L + R_C(1 + G)} \qquad (14)$$

Re-arranging:

$$I_o[R_L + R_C(1 + G)] = GC - G \cdot K \cdot I_o R_L \qquad (15)$$

hence $$I_o[R_L(1 + GK) + R_C(1 + G)] = GC \qquad (16)$$

dividing by G $$I_o\left[R_L\left(\frac{1}{G} + K\right) + R_C\left(\frac{1}{G} + 1\right)\right] \qquad (17)$$

hence if G is very large $$I_o = \frac{C}{R_C + K \cdot R_L} \qquad (18)$$

From equation (18) it can be seen that the line current is determined by the value of the line resistance, because C, K and $R_C$ are fixed. By a suitable choice of C and K, the line current/line resistance can be "tailored" to suit any requirement, but can be closely similar to the constant voltage feed so that from the telephone subset it is not possible to discern the type of feed at the exchange. Thus any subset regulator will still operate in relation to line loop resistance variations.

Figure 7:
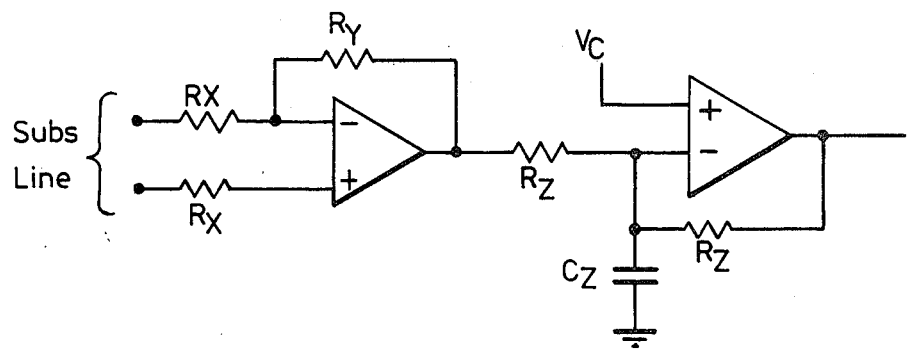
FIG. 7 shows one example of circuitry for the block FB of FIG. 6.

To achieve a high impedance to speech in the feed circuitry, the high gain amplifier must have a dynamic range which is responsive to speech frequencies, and the feedback path should be associated with a time constant such as to be unresponsive to speech frequencies but to be responsive to the direct voltage across the line. This is achieved by the circuit shown in FIG. 7, in which $K = (R_y/R_x)$, $R_z$ and $C_z$ having high values. K as given here is the K used in equations (13)–(18), above.

With the circuit used in the feedback path FB of FIG. 6, the dependence on battery voltage variations that exists in conventional feed arrangements is removed if the internal reference $V_C$ is held constant. The line current is then determined solely by loop resistance.

Figure 8:
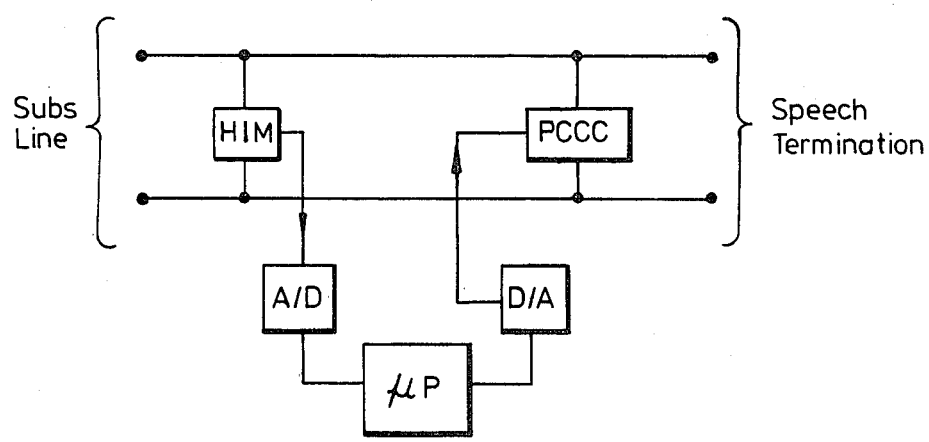
FIG. 8 is a further embodiment of the invention using a micro-processor.

In the arrangement of FIG. 8, the programmable control of the constant current generator PCCC is effected via a feedback loop between the high impedance monitor HIM and the generator PCCC. This loop includes an analogue/digital converter A/D, a microprocessor $\mu/P$ and a digital/analogue converter D/A. The microprocessor if equipped on a one per line basis can be used for additional purposes such as the provision of facilities. The monitor HIM can be similar to that of our British Appln. 7927421 (A. W. Sweet 15-5-3). Such an arrangement with suitable programming for the microprocessor, can control the line current in a manner similar to that of the previously described embodiment of the invention.

Figure 9:
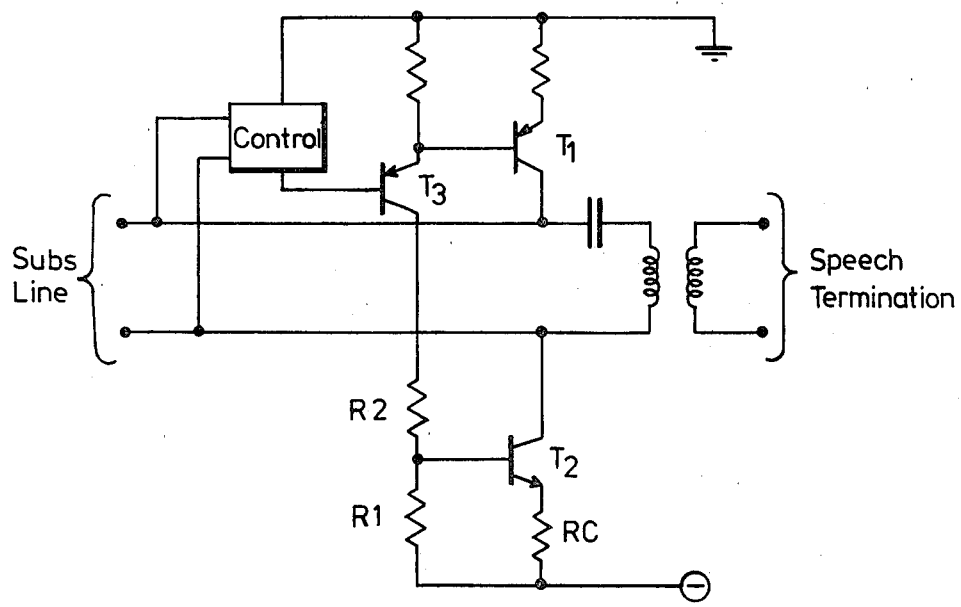
FIG. 9 is programmable constant current feed circuit for a balanced circuit arrangement.

In some cases a balanced feeding arrangement is used with a constant current feed. If such a balanced feed is needed, the circuit of FIG. 9 may be used. Here the transistors T1, T2 are complementary constant-current matched transistors, the current fed to the line being decided by the ratio of the base-to-earth voltage in the case of T1, and the base to negative supply voltage in the case of T2, divided by the value of the control resistor $R_C$. The control circuit in the CONTROL block takes the form already described, but an additional transistor T3 is needed, so that the output voltage may be simultaneously applied to the bases of T1 and T2 with the appropriate polarities.

I claim:

1. A line-feeding arrangement for a telephone subscriber's line, which includes a constant current generator circuit connected to the speech wires of the line so as to supply direct current thereto, the circuit having a high impedance to speech currents, a monitoring circuit also connected to the speech wires of the line so as to monitor the direct voltage between the speech wires, said monitoring circuit also having a high impedance to speech currents, control means associated with the monitoring circuit and the generator circuit to cause the current generated by the generator circuit to be varied in accordance with variations in the line voltage as monitored by the monitoring circuit, in which the monitoring circuit includes an operational amplifier having one of its inputs connected to one of the speech wires, the other speech wire being connected to the output of the amplifier, and a feedback loop connected between the subscriber's line and the other input of the amplifier, which feedback loop provides said control means and in which the feedback loop includes a second operational amplifier having its inputs connected respectively to the two line wires, the second operational amplifier having a feedback resistor connected across it, and a third operational amplifier having one of its inputs resistor-coupled to the output of the second operational amplifier and its other input connected to a reference voltage source, a resistor connected between the output of the second operational amplifier and the first input of the third operational amplifier, and a capacitor connected from said first input to ground.

2. An arrangement as claimed in claim 1, in which the line feed is balanced, with each of the two speech wires coupled via a separate transistor to one pole of the direct current supply, and in which the current fed via said two transistors is controlled from the control means via a third transistor.

* * * * *